United States Patent [19]

Schemelin et al.

[11] Patent Number: 5,154,043
[45] Date of Patent: Oct. 13, 1992

[54] HITCH SYSTEM FOR LAWN AND GARDEN TRACTORS

[76] Inventors: Michael P. Schemelin, 836 W. Badger La., West Bend, Wis. 53095; Gary A. Hays, 4520 Pioneer Rd., Cedarburg, Wis. 53012; Claude H. Leclair, 238 Manor Dr., Fredonia, Wis. 53021; John F. Jacque, 3709 Highland, Port Washington, Wis. 53074

[21] Appl. No.: 586,607

[22] Filed: Sep. 24, 1990

[51] Int. Cl.⁵ ............................................ A01D 34/00
[52] U.S. Cl. ...................................... 56/12.7; 56/15.6; 56/16.3
[58] Field of Search ............ 56/10.3, 12.7, 14.7, 56/14.9, 16.3, 15.6–15.9

[56] References Cited

U.S. PATENT DOCUMENTS

| | | | |
|---|---|---|---|
| 3,255,577 | 6/1966 | Colburn | 56/15.8 |
| 3,601,958 | 8/1971 | Roof | 56/14.9 |
| 3,680,292 | 8/1972 | McCanse | 56/16.3 |
| 3,706,186 | 12/1972 | Hurlburt et al. | 56/15.8 |
| 4,325,210 | 4/1982 | Marto | 56/15.8 |

Primary Examiner—Ramon S. Britts
Assistant Examiner—Robert J. Schoeppel
Attorney, Agent, or Firm—Reinhart, Boerner, Van Deuren, Norris & Rieselbach

[57] ABSTRACT

A hitch system for connecting utility attachments, such as mower decks, to lawn and garden tractors. A pair of J-shaped hooks are attached to the front axle assembly to the tractor. An elongate hitch bracket, having a handle at its forward end, it pivotally connected to the forward end of the mower deck. A hanger rod extends across the hitch bracket and engages the hooks so that the hitch bracket and mower deck ar trailed behind the front axle of the tractor. A user-releasable latch helps retain the hanger rod within the hooks and can be released while the user grasps the handle. The handle provides a convenient means for manipulating the mower deck as it is connected and disconnected from the tractor.

18 Claims, 2 Drawing Sheets

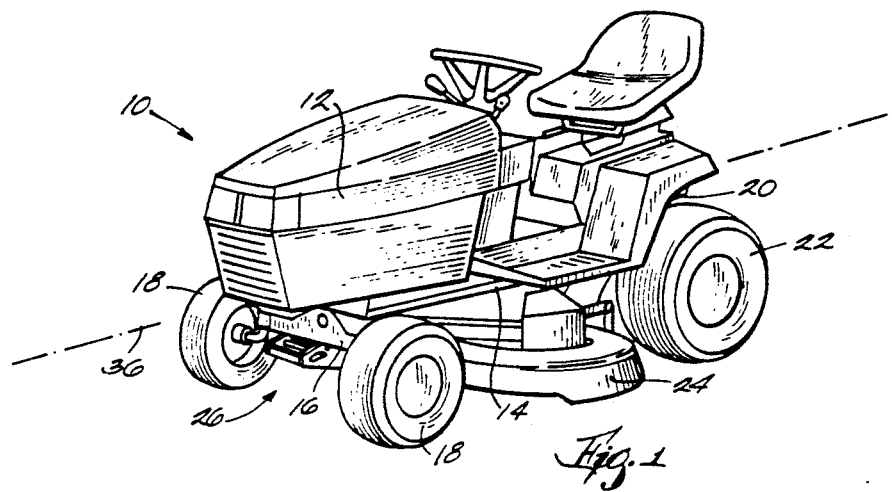
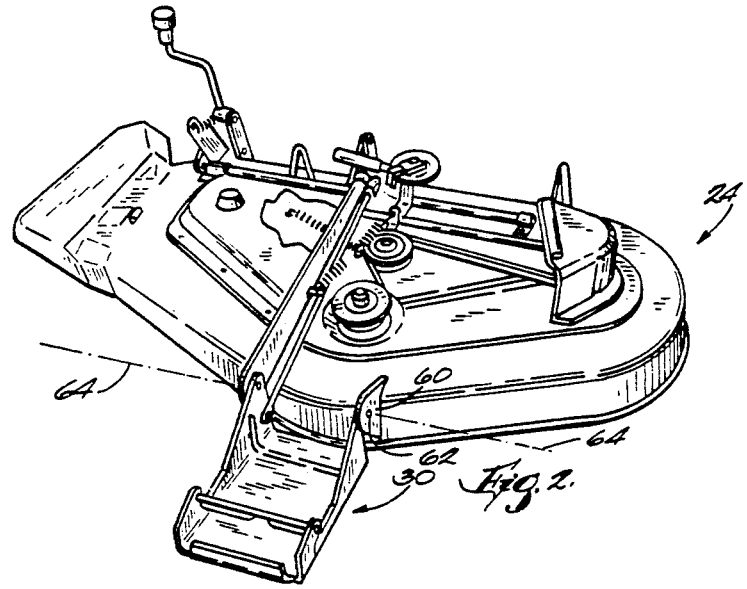
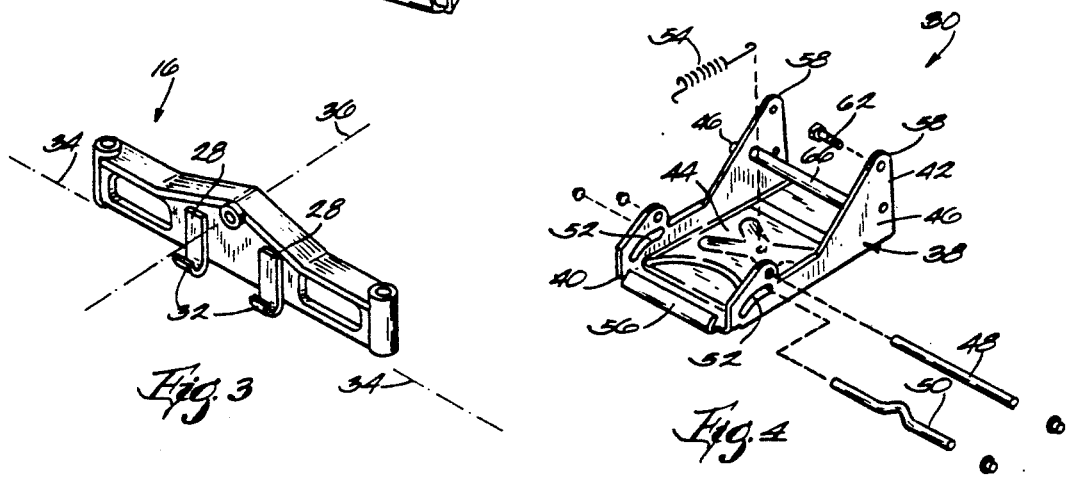

HITCH SYSTEM FOR LAWN AND GARDEN TRACTORS

BACKGROUND OF THE INVENTION

This invention relates generally to lawn and garden tractors and more particularly, to hitch mechanisms for mounting utility attachments to such lawn and garden tractors.

Today's lawn and garden tractors do far more than simply cut grass. With the right attachments, such tractors can clear snow, spread fertilizer, cultivate soil and haul material. Convenience and utility, however, frequently depend on the ease with which attachments can be installed and removed. Unnecessary complexity or difficulty increases the time and effort needed to change attachments and can drastically compromise the overall utility of the machine.

Although a simple hitch and pin arrangement will suffice for connecting attachments that are trailed behind a tractor, the connection of attachments that are mounted under or forward of the tractor is more complex. These attachments, which typically include mower decks and snow throwers, require greater support as well as some form of power takeoff connection to the tractor's engine or prime mover. Both requirements increase the complexity and difficulty of connecting the attachment particularly when the attachment is heavy, unwieldy or hard to handle.

In typical arrangements, nuts, bolts, clevis pins, etc., are used to secure the attachments to a tractor. This is a difficult and time consuming method in that the fasteners are awkward and difficult to handle, particularly in cold weather or when the weight or size of the attachment makes it difficult to align the mounting holes.

In view of the foregoing, it is a general object of the present invention to provide a new and improved hitch system for lawn and garden tractors. It is another object of the present invention to provide a new and improved hitch system that allows convenient and simple connection and removal of attachments that are mounted under or in front of the tractor.

It is still another object of the present invention to provide a new and improved hitch system that can be operated quickly, easily and without the need to handle a multitude of small parts.

It is still another object of the present invention to provide a new and improved hitch system that simplifies the task of aligning a heavy attachment with the tractor.

SUMMARY OF THE INVENTION

The invention provides a hitch system for connecting an attachment to a lawn and garden tractor comprising a pair of hooks mounted on the forward face of the front axle assembly of the tractor and a hitch bracket assembly mounted to the forward end of the attachment. The hitch bracket assembly includes a transverse hanger rod engageable with the hooks so as to trail the attachment behind the hooks, and further includes a user-releasable latch for retaining the hanger rod in engagement with the hooks while the attachment is connected to the lawn and garden tractor.

The invention also provides a hitch for connecting a utility attachment to a lawn and garden tractor. The hitch comprises a pair of J-shaped hooks mountable on the forward face of the front axle assembly of the tractor, and further includes a hitch bracket comprising an elongated member having a forward end, a rearward end, a substantially planar bottom panel and a pair of spaced, substantially parallel side panels oriented substantially perpendicularly to the bottom panel along the side edges thereof. The hitch further includes a hanger rod mounted transversely across the side panels adjacent the forward end of the hitch bracket and oriented so as to be receivable in the hooks. A latch rod is mounted transversely across the side panels for lateral movement between a latched position, wherein the latch rod is positioned parallel to and substantially directly below the hanger rod, and an unlatched position wherein the latch rod is positioned below and substantially forwardly of the hanger rod. A spring is provided for biasing the latch rod toward the latched position, and structure is provided adjacent the rearward end of the hitch bracket for pivotally mounting the hitch bracket to the forward end of the utility attachment.

The invention also provides a lawn and garden tractor comprising a prime mover, a frame supporting the prime mover, a forward axle assembly mounted to the frame and having a substantially vertical forward face, a pair of hooks mounted on the forward face of the front axle assembly, a mower deck having a forward end positioned below the frame and behind the forward axle assembly, a hitch bracket mounted to the forward end of the mower deck, a hanger rod extending across the hitch bracket forward of the mower deck and engageable with the hooks, and a user-releasable latch for retaining the hanger rod in engagement with the hooks so that the hitch bracket and the mower deck are trailed behind the forward axle and below the frame as the tractor operates.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a perspective view of a lawn and garden tractor incorporating a hitch system embodying various features of the invention.

FIG. 2 is a perspective view of a mower deck attachment having a hitch bracket assembly constructed in accordance with one aspect of the invention.

FIG. 3 is a perspective view of a tractor front axle assembly constructed in accordance with one aspect of the invention.

FIG. 4 is an exploded perspective view of a hitch bracket assembly constructed in accordance with one aspect of the invention.

DESCRIPTION OF THE PREFERRED EMBODIMENT

Figure 5:
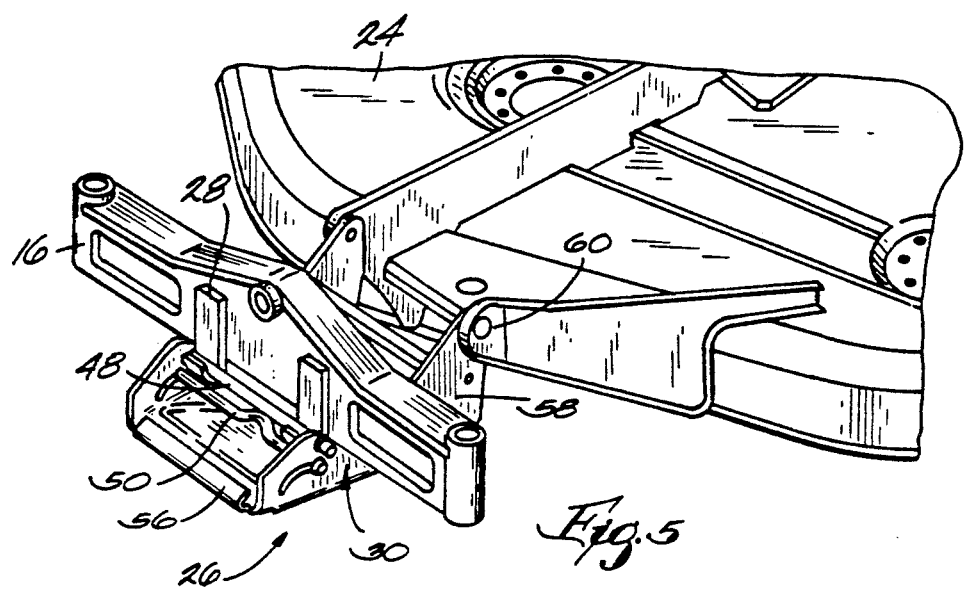
FIG. 5 is a fragmentary perspective view showing the hitch bracket assembly in engagement with the front axle assembly.

Referring to the drawings, a lawn and garden tractor 10 embodying various features of the invention is illustrated in FIG. 1. The tractor 10 comprises a prime mover, such as a gasoline engine 12, mounted on a frame 14. The frame 14 includes a forward axle assembly 16 rotatably supporting a pair of front wheels 18, and a rearward axle assembly 20 rotatably supporting a pair of rear wheels 22. A utility attachment, in the form of a mower deck 24, is located beneath the frame 14 between the front and rear wheels 18, 22. The mower deck 24 is removably coupled to the tractor frame 14 by means of a detachable hitch system 26.

In the illustrated embodiment, the hitch system 26 generally comprises a pair of hooks 28 (FIG. 3) mounted on the forward face of the front axle assembly 16. The hitch system 26 further comprises a hitch bracket assembly 30 (FIG. 2) connected to the forward end of the mower deck 24. Preferably, each hook 28 is shaped like the letter "J" and is formed of a rigid, durable material such as heavy gauge steel. The hooks 28 are welded or otherwise attached to the forward face of the front axle assembly 16 and are oriented so their curved lower portions 32 define a substantially horizontal axis 34 extending parallel to the axis of the front axle assembly 16 and perpendicularly to the longitudinal axis 36 of the tractor.

Figure 6:
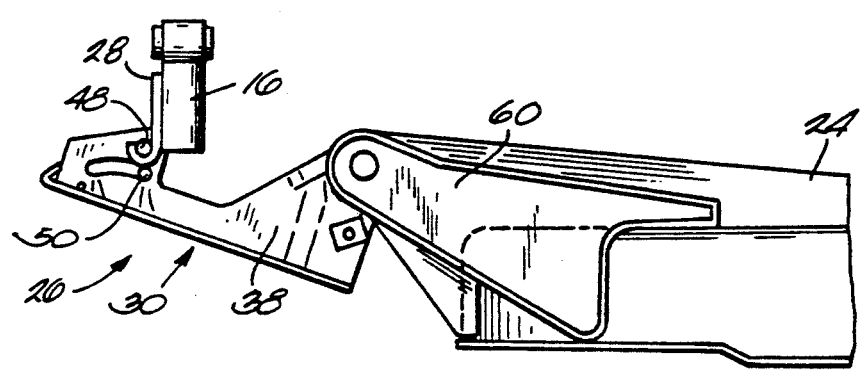
FIG. 6 is a fragmentary side view of the hitch bracket assembly and front axle assembly shown in FIG. 5.

Referring to FIGS. 2 and 4, the hitch bracket assembly 30 comprises a elongate hitch bracket 38 having a forward end 40, a rearward end 42, a substantially planar bottom panel 44 and a pair of spaced, substantially parallel side panels 46 oriented substantially perpendicularly to the bottom panel 44 along the side edges thereof. Preferably, the hitch bracket 38 comprises a unitary structure that is stamped or otherwise formed from a rigid, durable material such as steel. Adjacent the forward end 40, the hitch bracket assembly 30 includes a transverse hangar rod 48 extending across the hitch bracket 38 between the side panels 46. The hanger rod 48 is positioned somewhat above the bottom panel 44 so as to be engagable with the hooks 28 as shown in FIGS. 5 and 6. When so engaged, the hitch bracket assembly 30, and the mower deck 24 attached thereto, are trailed behind the forward axle 16 and below the frame 14 as the tractor 10 operates.

In accordance with one aspect of the invention, a user-releasable latch is provided for retaining the hanger rod 48 in engagment with the hooks 28 while the mower deck 24 is connected to the lawn and garden tractor 10. In the illustrated embodiment, the user-releasable latch includes a transverse latch rod 50 extending across the hinge bracket 38 between the side panels 46. The latch rod 50 is mounted for lateral movement between a latched position wherein the latch rod 50 is parallel to and substantially directly below the hanger rod 48, and an unlatched position wherein the latch rod 50 is below and substantially forward of the hanger rod 48. Preferrably, a pair of opposed, longitudinally extending slots 52 are formed in the side panels 46, and the ends of the latch rod 50 are received in the slots 52. This allows the latch rod 50 to be moved forwardly to the unlatched position or rearwardly to the latched position. Preferably, a spring 54 connected between the latch rod 50 and the bottom panel 44 of the hitch bracket 38, biases the latch rod 50 toward the rearward, latched position. Preferably, the opposed slots 52 include a ramped forward portion so that the latch rod 50 moves forwardly and downwardly toward the bottom panel as it moves to the unlatched position against the bias of the spring 54.

In accordance with another aspect of the invention, the hitch bracket assembly 30 serves as a handle to allow the installer to move and position the mower deck 24 with ease. To this end, a handle 56 is formed at the extreme forward end of the hitch bracket 38. Preferrably, the handle 56 is integrally formed in the bottom panel 44 between the forward ends of the side panels 46. The handle 56 is located so that the latch rod 50 falls naturally under the user's fingers when the handle is grasped with a natural grasping motion the user can manually pull the latch rod 50 to the unlatched position. This permits simple one-handed installation or removal of the mower deck 24. In addition, the handle is preferably shaped so as to conform to the shape of the hand to simplify handling and enhance user comfort.

Preferably, the hitch bracket assembly 30 is mounted for pivotal movement relative to the mower deck 24. To this end, the rearward ends of the side panels slope upwardly to form a pair of opposed pivot ears 58, and a pair of complimentary pivot ears 60 extend forwardly from the forward end of the mower deck 24. Pivot bolts 62 extend through the adjacent ears 58, 60 to secure the hitch bracket assembly 30 for pivoting movement around a substantially horizontal axis 64 relative to the mower deck 24. To further simplify installation, an additional transverse rod 66 extends between the ears 58 of the side panels 46 and serves as a forward stop to limit forward travel of the hitch bracket assembly 30 relative to the tractor front axle assembly 16. As best seen in FIG. 4, the additional transverse rod 66 is laterally spaced from, and substantially parallel to, the forward hanger rod 48. Because of the rigidity of the hitch bracket 38, the additional transverse rod 66 remains substantially parallel to the forward hanger rod 48 as twisting forces are transferred from the forward axle 16 to the mower deck 24.

The hitch system herein shown and described provides a simple, quick and convenient means for attaching a utility attachement to a garden tractor. The hitch bracket assembly 30 serves not only to secure the attachment to the tractor but also serves as a handle for moving and positioning the attachment. One-handed operation from an accessible position adjacent the front of the tractor is provided. In addition, the hitch system 26 is simple and reliable in operation, and economical in manufacture. Although the hitch system 26 has been shown and described in the context of a mower deck 24, it will be appreciated that the system can be adapted for use with a variety of other utility attachments. Furthermore, the hitch system can be used with a variety of lawn and garden care products including, but not limited to, front and rear engine mowers, compact utility tractors, and other such mowers. Accordingly, the term "mowing tractors" as used herein is intended to include all such mower devices.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A hitch system for connecting an attachment to a lawn and garden tractor having a forward axle, said hitch system comprising:
   a hook rigidly mounted to and carried on said forward axle; and
   a hitch bracket assembly rigidly mounted to the forward end of the attachment, said hitch bracket assembly having a transverse member and a transverse hanger rod laterally spaced from and substantially parallel to said transverse member and engagable with the said hook so as to trail the attachment behind said hook, said hitch bracket further having user-releaseable latch means for rigidly retaining said hanger rod in engagement with said hook while the attachment is connected to the lawn and garden tractor so that movement of said forward axle while the lawn and garden tractor traverses the ground is transferred to the attachment and so that said transverse member and said transverse hanger rod remain substantially parallel as twisting forces are transferred from the forward axle through the hitch bracket to the attachment.

2. A hitch system as defined in claim 1 wherein said hitch bracket assembly further includes a user-graspable handle at its forward end opposite the attachment.

3. A hitch system as defined in claim 2 wherein said user-releasable latch means comprises a transverse latch rod substantially parallel and vertically displaced from said hanger rod and positioned to extend below said hook to retain said hanger rod in said hook when the attachment is connected to the lawn and garden tractor.

4. A hitch system for connecting an attachment to a lawn and garden tractor comprising:
 a hook disposed adjacent the front of the tractor; and
 a hitch bracket assembly mounted to the forward end of the attachment, said hitch bracket assembly having a transverse hanger rod engagable with the said hook so as to trail the attachment behind said hook and further having user-releasable latch means for retaining said hanger rod in engagement with said hook while the attachment is connected to the lawn and garden tractor;
 said hitch bracket assembly further including a user-graspable handle at its forward end opposite the attachment;
 said user-releasable latch means further comprising a transverse latch rod substantially parallel to and vertically displaced from said hanger rod and positioned to extend below said hook to retain said hanger rod in said hook when the attachment is connected to the lawn and garden tractor; and
 said user-releaseable latch means further including a spring for biasing said transverse latch rod toward said position below said hook.

5. A hitch system as defined in claim 4 wherein said transverse latch rod is mounted for user-induced lateral movement in a forward direction against the bias of said spring so as to allow disengagement of said hanger rod from said hook and disconnected of the attachment from the tractor.

6. A hitch system as defined in claim 5 wherein said hitch bracket assembly is pivotally connected at its rearward end to the attachment.

7. A hitch system as defined in claim 6 wherein said hitch bracket assembly comprises an elongate hitch bracket having a substantially planar bottom panel and a pair of spaced, substantially parallel side panels oriented substantially perpendicularly to said bottom panel along the side edges thereof.

8. A hitch system as defined in claim 7 wherein said transverse hanger rod and said transverse latch rod are each mounted between and supported by said side panels.

9. A hitch system as defined in claim 8 wherein the ends of said transverse rod are supported within substantially longitudinally extending opposed slots formed in said side panels.

10. A hitch system as defined in claim 9 wherein said handle is integrally formed in said bottom panel of said hitch bracket.

11. A hitch for connecting a utility attachment to a mowing garden tractor, said hitch comprising:
 a pair of J-shaped hooks mountable on the forward face of the front axle assembly of the tractor;
 a hitch bracket comprising an elongate member having a forward end, a rearward end, a substantially planar bottom panel and a pair of spaced, substantially parallel side panels oriented substantially perpendicularly to said bottom panel along the side edges thereof;
 a hanger rod mounted transversely across said side panels adjacent said forward end of said hitch bracket and oriented so as to be receivable in said hooks;
 a latch rod mounted transversely across said side panels for lateral movement between a latched position wherein said latch rod is positioned parallel to and substantially directly below said hanger rod, and an unlatched position wherein said latch rod is positioned below and substantially forwardly of said hanger rod;
 a spring for biasing said latch rod toward said latched position; and
 means adjacent said rearward end of said hitch bracket for pivotally mounting said hitch bracket to the forward end of the utility attachment.

12. A hitch as defined in claim 11 wherein said hitch bracket further includes a handle formed adjacent said forward end.

13. A hitch as defined in claim 12 wherein said handle is integrally formed in said bottom panel.

14. A hitch as defined in claim 13 wherein said hitch bracket comprises a unitary metallic structure.

15. A mower tractor comprising:
 a prime mover;
 a frame supporting said prime mover;
 a forward axle assembly mounted to said frame and having a substantially vertical forward face;
 a pair of hooks mounted on said forward face of said axle assembly;
 a mower deck positioned below said frame and behind said forward axle assembly, said mower deck having a forward end;
 a hitch bracket mounted to said forward end of said mower deck;
 a first transverse member comprising a hanger rod extending across said hitch bracket forward of said mower deck and engagable with said hooks;
 a second transverse member extending across said hitch bracket laterally spaced from and substantially parallel to said hanger rod;
 user-releaseable latch means for retaining said hanger rod in rigid engagement with said hooks so that said hitch bracket and said mower deck are trailed behind said forward axle and below said frame as said tractor operates;
 said hitch bracket being sufficiently rigid so that said second transverse member remains substantially parallel to said hanger rod as twisting forces are transferred from said forward axle through said bracket and so that the orientation of said mower deck relative to said forward axle assembly remains substantially constant as the mowing tractor traverses the ground.

16. A mowing tractor as defined in claim 15 wherein said hitch bracket includes a handle at its forward end.

17. A mowing tractor as defined in claim 16 wherein said user-releasable latch means is releasable while the user grasps said handle.

18. A mowing tractor as defined in claim 17 wherein said hitch bracket is pivotable relative to said forward end of said mower deck.

* * * * *